United States Patent
Pukemo

(10) Patent No.: US 10,364,172 B2
(45) Date of Patent: Jul. 30, 2019

(54) BIOSORPTION WASTEWATER TREATMENT SYSTEM

(71) Applicant: Mikhail Pukemo, Moscow (RU)

(72) Inventor: Mikhail Pukemo, Moscow (RU)

( * ) Notice: Subject to any disclaimer, the term of this patent is extended or adjusted under 35 U.S.C. 154(b) by 195 days.

(21) Appl. No.: 15/491,641

(22) Filed: Apr. 19, 2017

(65) Prior Publication Data

US 2018/0305232 A1  Oct. 25, 2018

(51) Int. Cl.
| | |
|---|---|
| *C02F 3/08* | (2006.01) |
| *C02F 3/12* | (2006.01) |
| *C02F 3/02* | (2006.01) |
| *C02F 3/00* | (2006.01) |
| *C02F 1/52* | (2006.01) |
| *C02F 3/10* | (2006.01) |

(52) U.S. Cl.
CPC ............... *C02F 3/085* (2013.01); *C02F 1/52* (2013.01); *C02F 3/006* (2013.01); *C02F 3/106* (2013.01); *C02F 2209/008* (2013.01); *C02F 2209/42* (2013.01); *C02F 2303/16* (2013.01); *Y02W 10/15* (2015.05)

(58) Field of Classification Search
CPC .. C02F 1/52; C02F 2209/008; C02F 2209/42; C02F 2303/16; C02F 3/006; C02F 3/085; C02F 3/106
See application file for complete search history.

(56) References Cited

U.S. PATENT DOCUMENTS

| | | | | |
|---|---|---|---|---|
| 3,968,034 A | * | 7/1976 | Tymoszczuk | ............ C02F 3/06 210/618 |
| 6,048,459 A | * | 4/2000 | Khudenko | ............... B01J 8/007 210/150 |
| 2010/0089825 A1 | * | 4/2010 | Canzano | ................. C02F 3/006 210/610 |

FOREIGN PATENT DOCUMENTS

EP  1156016 A2 * 11/2001 ............. C02F 3/085

* cited by examiner

*Primary Examiner* — Terry K Cecil
(74) *Attorney, Agent, or Firm* — Nasser Ashgriz; UIPatent Inc.

(57) ABSTRACT

The invention relates to wastewater treatment systems, in particular to biosorbers for wastewater treatment, comprising a bioreactor with a fluidized bed of charge and a layer of filtering charge, a system for saturating the water with air or oxygen, a sewage treatment pipeline, a purified water discharge line and a recirculated flow line with a circulating pump. According to the invention, the biosorber includes a receiving and dispensing chamber connected via a metering pump to the chamber with a coal removal trap that is connected to the fluidized bed bioreactor through a circulation pump, the biosorber including an automated biosorber control module, the bioreactor being provided with a convex reflector for activated coal, installed in the upper part of the bioreactor, designed to provide laminar upward movement of liquid along the walls of the bioreactor. The technical result achieved is to increase the degree of wastewater treatment while ensuring high reliability of operation.

13 Claims, 3 Drawing Sheets

BIOSORPTION WASTEWATER TREATMENT SYSTEM

FIELD OF THE INVENTION

The present invention relates in general to wastewater treatment systems, and in particular to a biosorption wastewater treatment system.

BACKGROUND OF THE INVENTION

Treatment and purification of wastewater is regularly utilized in industrial and domestic wastewaters. In particular, with ever increasing water shortage, proper handling of domestic and industrial wastewater has become more important. In addition, discharge of wastewater in rivers and lakes requires a prior treatment to remove hazardous materials. Various treatment systems are used to decontaminate the wastewater. One important stage of wastewater treatment is biological oxidation. Powdered activated carbons/coal (sorbents) are commonly used to adsorb and remove biologically inhibitory organic compounds. Other types of sorbents are natural and synthetic zeolites, and ion exchangers.

One of the shortcoming of the prior art that use a bioreactor is that they have a low degree of wastewater treatment, as well as low reliability of the biosorber. This is due to the fact that activated coal (sorbent), is subject to colmatage (i.e., blockage, clogging, natural carburizing), and it may wash out of the bioreactor chamber. The present devices are invented to overcome the shortcomings of the prior art bioreactor for wastewater treatment, and mitigate at least one of the above disadvantages, namely, to improve the degree of wastewater treatment while providing high operational reliability.

SUMMARY OF THE INVENTION

The present invention is a biosorber for wastewater treatment comprising of a fluidized bed bioreactor, a system for saturating the water with air or oxygen, a sewage treatment pipeline for processing, a purified water discharge pipeline, and a recirculated flow line with a circulation pump. The biosorber comprises of a receiving and metering chamber connected through a metering pump to a chamber with a coal discharge trap that is connected to a fluidized bed bioreactor via a circulation pump. The biosorber comprises of an automated biosorber control module, wherein the bioreactor is provided with a convex activated carbon reflector mounted at the top of the bioreactor. The system is designed to provide a laminar upward movement of liquid along the walls of the bioreactor.

The main objective of the present invention is to provide a biosorber for wastewater treatment that can be installed at the stations of deep biochemical and biological treatment of domestic sewage to clean up the drainage from residential complexes, hotels, boarding houses, sanatoria, residential complexes, cottage settlements, microdistricts, settlements etc.

The present system utilizes the synergy between sorption and biological treatment or biosorption for the treatment of a wastewater. Biosorption is a physical and chemical process providing for natural accumulation of biomass and binding the pollutants within its cell structure. Inside the biosorber, biofilm develops on the sorbent surface to produce an equilibrium osmotic system with sorbent. Use of sorbent as the carrier for biomass formation considerably intensifies the biosorption treatment processes, including enzymatic hydrolysis of pollutants that are used by biomass as substrate. The use of sorbent also provides for greater stability of the quality of treatment at high volatility of pollutant concentration.

The purpose of the present biosorber is providing advanced treatment of the wastewater that has passed biological treatment. In the course of the facility operation, reduction in chemical oxygen demand (COD) and biochemical oxygen demand (BOD), and sewage sludge (SS) remained after the stage of biological treatment is observed.

The present biosorber is made of a single housing that accommodates all process chambers and tanks, as well as all accessories and pumps. The unique features of the proposed invention are (i) a hydraulic regime of the sorbent operation; (ii) a biological regeneration of the sorbent; (iii) a system of holding the grains of the entrained sorbent, and (iv) an absence of filters to be washed out.

The present system provides an accelerated regeneration of the charge, due to the presence of a coal-trapping chamber. This makes it possible to precipitate fine particles of sorbent (coal dust) and suspended solids. An automated biosorber controls the operation of the system and the pumps to prevent load colmatation.

A convex reflector of active coal (sorbent) provides (i) a laminar upward flow of a liquid along the walls of the bioreactor; (ii) an increase in the working height of the bioreactor due to an absence of a diffuser in the upper part of a column-tube of the reactor; (iii) a retention of active coal (sorbent), and (iv) a fixation of the intake throat.

The present system has a dosing and a receiving chamber which comprises of a container for the coagulant that is connected to a coagulant dispenser. Due to this advantageous characteristic, it is also possible to combine fine dispersed particles into larger aggregates, resulting in the formation of a network structure or causing the precipitation of a coagulum-flocculent deposit that is easily removed.

In one embodiment of the present invention, the convex reflector of active coal (sorbent) is made in the form of a cone. This makes the manufacturing of this part simple and inexpensive.

In another embodiment of the present invention, the coagulant dispenser is in the form of a dosing peristaltic coagulant pump. This allows a very well control of the dispensing amount.

In another embodiment of the present invention, the biosorber has an automated control module, which is connected to a coagulant sensor mounted on a coagulant tank. Therefore, it is possible to monitor the presence of a coagulant and, when exhausted, transmit signaling signals.

In another embodiment of the present invention, the biosorber automated control module is connected to a dosing pump. Therefore, it is possible to control the metering pump, and periodically turn it on and off, thus regulate the level of effluent in the bioreactor.

In another embodiment of the present invention, the biosorber automated control module is connected to an air compressor of a system for saturating water with air or oxygen. Therefore, it is possible to control the operation of an air compressor of the system of water saturation with air or oxygen.

In another embodiment of the present invention, the biosorber automated control module is connected to a dispenser for the coagulant. Therefore, it is possible to control the amount of coagulant that is added to the effluent.

In another embodiment of the present invention, the air compressor has a check valve to prevent water from entering. Therefore, it is possible to prevent water from entering the air compressor.

There are other variants of the present invention, in which the biosorber automated control module is connected to a wastewater level sensor located in the receiving-metering chamber. Therefore, it is possible to monitor the level of sewage in the receiving-dosing chamber. If the level falls outside the established limits, it is possible to switch on or off the corresponding pump to maintain the sewage level within the required limits.

In another embodiment of the present invention, the biosorber automated control module is connected to the pump operation alarm unit and emergency levels of the treated waters. Therefore, it is possible to signal faults in the operation of the pumps, as well as when the water level is out of the established critical limits.

In another embodiment of the present invention, the automated biosorber control module is connected to the SMS short messaging system or SMS, which signals the loss and recovery of power supply, the occurrence of a dosing and circulating pump failure. Therefore, it becomes possible to make SMS-notification of the user in critical situations, for example, in case of loss and restoration of power supply, and the occurrence of a failure of the metering and circulation pumps.

BRIEF DESCRIPTION OF THE DRAWINGS

Other features and advantages of the invention clearly follow from the description given below for illustration and not being limiting, with reference to the accompanying drawings in which.

DETAILED DESCRIPTION OF PREFERRED EMBODIMENTS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Figure 1:
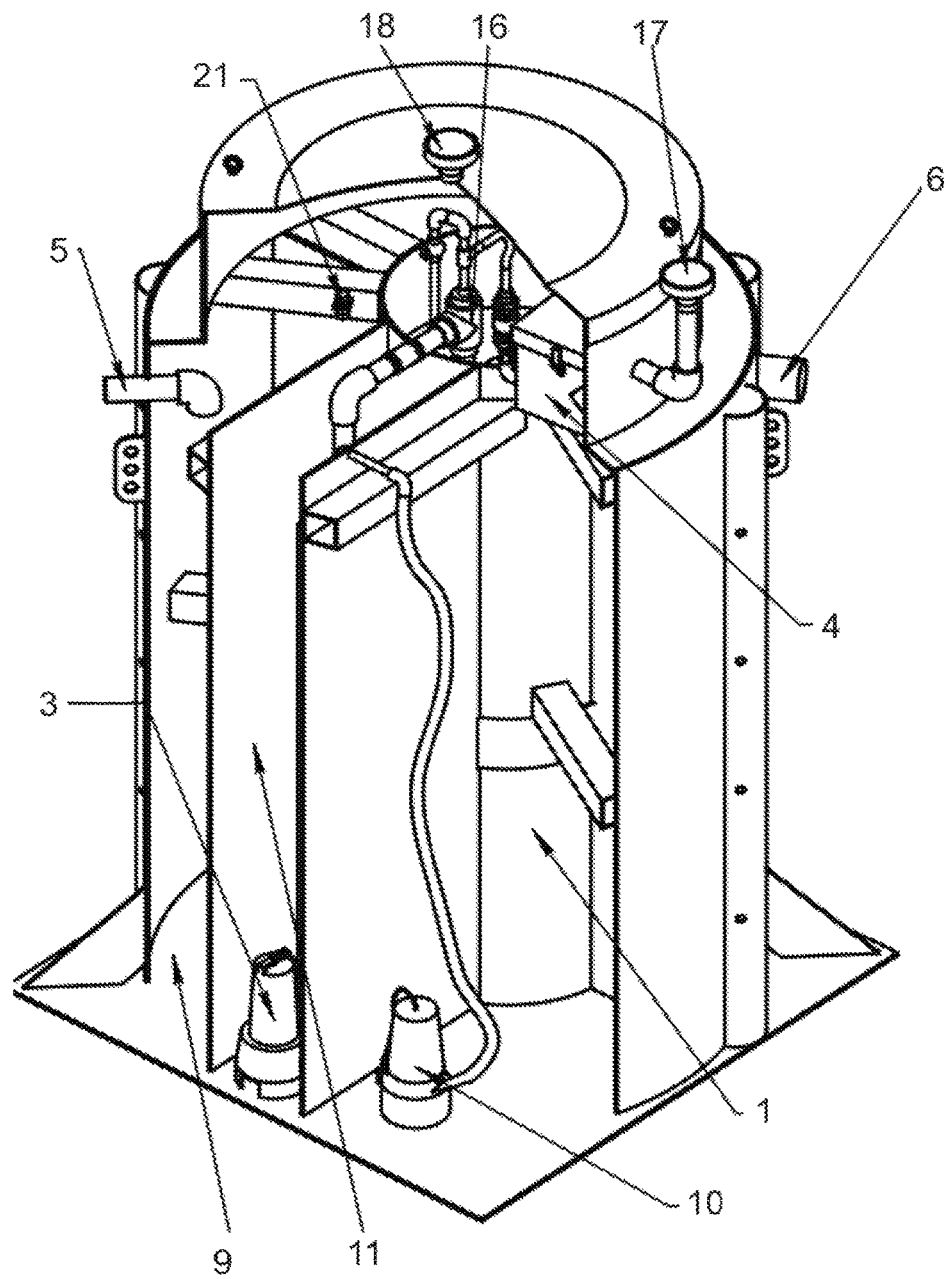
FIG. 1 schematically shows the appearance of a biosorber for wastewater treatment, a partially sectioned view, in accordance with the invention.
Figure 2:
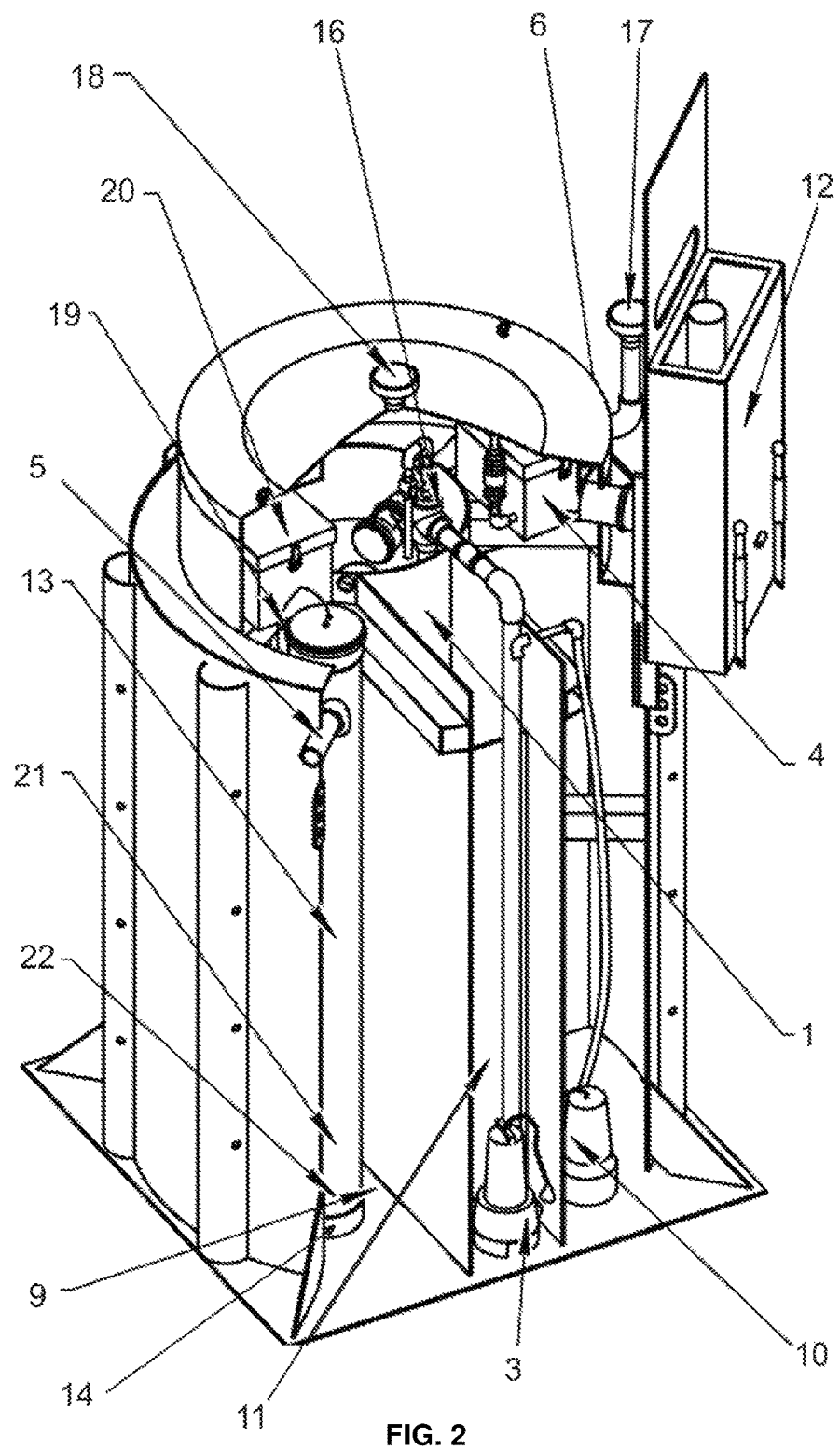
FIG. 2 schematically shows another appearance of the biosorber for wastewater treatment, a partially sectional view, according to the invention.
Figure 3:
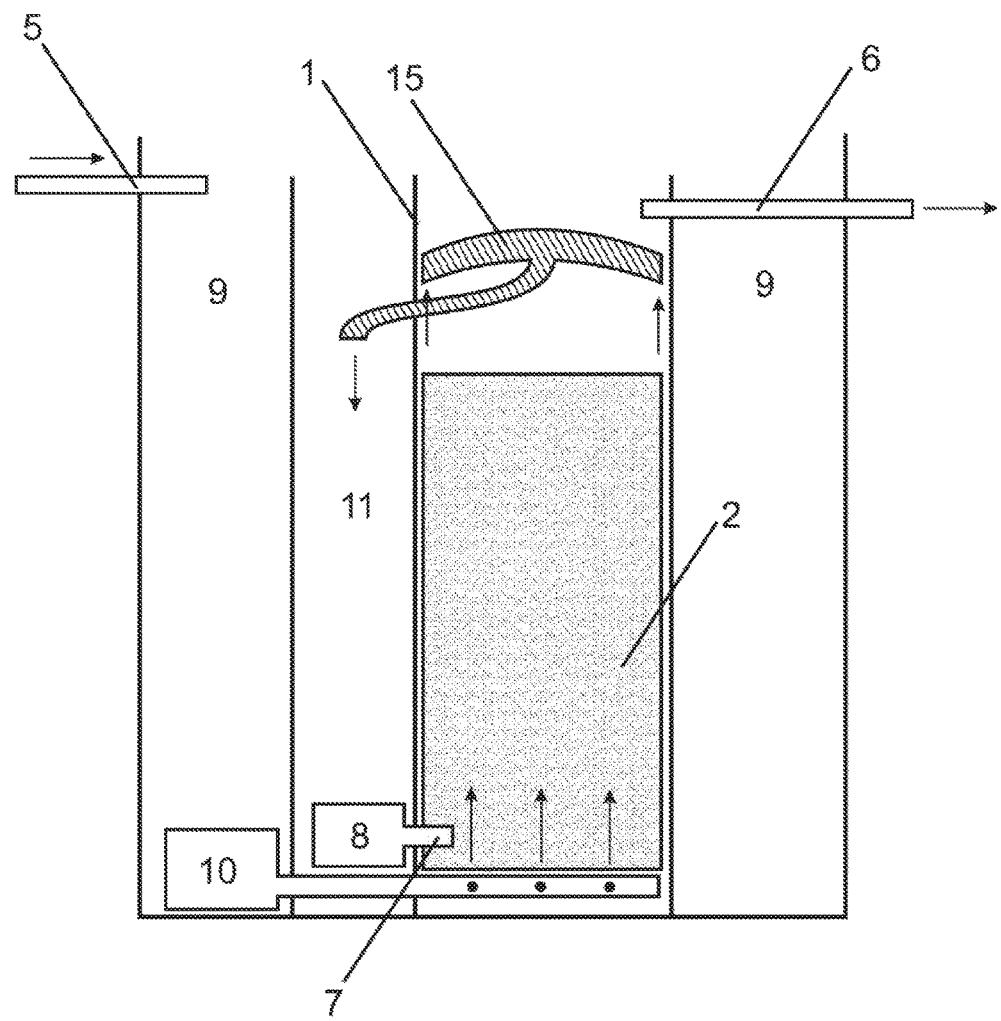
FIG. 3 schematically shows a partial functional scheme of a biosorber for wastewater treatment, according to the invention.

According to FIGS. 1 to 3, the wastewater biosorber comprises of a bioreactor 1 with a fluidized bed of charge (sorbent) 2, a system for saturating the water with air or oxygen comprising a pump of the system for saturating the water with air or oxygen 3, a compressor of the system for saturating the water with air or oxygen 4, a sewage pipeline 5 for treatment, a purified water outlet line 6 and a recirculated flow line 7 with the circulation pump 8. The biosorber also comprises of a receiving and dispensing chamber 9 connected through a dispensing pump 10 to a coal (sorbent) removal chamber 11 that is connected to a fluidized bed bioreactor via a circulation pump. The biosorber comprises of a control module 12 for automated biosorber control. The receiving and dispensing chamber 9 comprises a coagulant tank 13 connected to a coagulant dispenser 14. The system further comprises of a convex reflector of activated coal (sorbent) 15, a servo-injector of the system for hydroaeration 16, an air intake line 17, a ventilation system 18, a level sensor of the sewage 19, a peristaltic dosing pump 20, a coagulant level sensor 21, and a coagulant filter-collector 22.

The bioreactor 1 is provided with a convex reflector of active charcoal (sorbent) 15 installed in the upper part of the bioreactor 1 configured to provide a laminar upward movement of the liquid along the walls of the bioreactor 1. The convex reflector of the active coal (sorbent) 15 can be of any shape, preferable made in the form of a cone.

The dispenser for the coagulant can be made in the form of a dosing peristaltic coagulant pump. FIG. 1 schematically shows the biosorber for wastewater treatment, a partially sectioned view, in accordance with the present invention. The automated control module for biosorber 12 can be connected to a coagulant level sensor 21 mounted on a container for the coagulant tank 13; the dispensing pump 10; and the air compressor 4 systems of water saturation with air or oxygen.

The automated control module of the biosorber 12 can be connected to the dispenser for the coagulant 14. The air compressor 4 can have a check valve to prevent water from entering. The figures are not shown. The automated control module for the biosorber 12 can be connected to the wastewater level sensor located in the receiving-dosing chamber. The module for automated control of the biosorber 12 can be connected to the pump operation and alarm units to alarm any emergency levels of the treated waters. The figures are not shown. The module for automated control of the biosorber can be connected to a SMS notification subsystem, which signals the loss and recovery of power supply, to notify the occurrence of a failure of the metering and circulating pumps. The figures are not shown.

Wastewater to be treated arrives through the inlet pipe branch 5 to the receiving and dispensing chamber 9 that provides balancing, accumulation and settling of the wastewater before it is delivered to the biochemical reactor 1. In the reception part of tank, above the inlet pipe branch 5, there is an emergency high level gauge for wastewater 19 and an emergency overflow hole. In the outlet dispensing part of the receiving and dispensing chamber 9, there is the dispensing pump 10 for automatic dispensing of the wastewater to the biochemical reactor 1.

The biochemical reactor 1 of the facility carries out the process of biosorption water treatment based on simultaneous implementation of the processes of adsorption of organic and inorganic compounds (pollutants) by advanced submicron structure of activated charcoal and injection of biologically significant chemical macro elements of air involved in regeneration of biochemical activity of the sorbent 2, and decomposition of the pollutants, through the fluidized bed of sorbent 2. Processes of adsorption and sorbent regeneration are carried out by the hydro aeration system 16. The sorbent microfiltration and fluidization module has a circulation pump 3 with a valve for flow throttling, an air compressor 4 with check valve for preventing entry of water, and the servo injector with hydro aerator line decompression valve to eliminate air filling of the coal removal chamber 11. The circulation pump 3 and compressor 4 operates automatically. Purified water goes out through the pipe branch 6 by means of its displacement from the reactor 1 simultaneously with supply of the next portion of polluted wastewater by the dispensing pump 10 to the coal removal chamber 11. Wastewater being treated in the biochemical reactor 1 turns around the charcoal reflector 15 and comes to the coal removal chamber 11. The entrained charcoal particles settle in a catcher within the coal removal chamber 11.

The automated control system 12 provides the wastewater treatment process, functional monitoring of pump 3, 10 and compressor 4 operation, and indication and alarm system to show the current condition of the facility.

Velocity of the ascending stream of liquid in the sorbent layer 2 is chosen in such a way that the sorbent will expand, however, without movement of the sorbent particles relative to each other. Such regime of liquid movement in the biosorber allows reduction in the number of suspended substances in the purified water at the facility outlet and extension of the sorbent service life.

In the process of operation, the sorbent undergoes bio-regeneration which involves primarily two stages: (i) in the course of treatment, the sorbate loses its sorption ability after enzymatic hydrolysis; (ii) in the course of treatment, the sorbate is desorbed in the biofilm matrix under the influence of osmotic forces.

The sorbent material used may comprise any of a number of sorbent materials including granular or powdered solid sorbents which are used to remove dissolved materials from liquids. The type of sorbent used depends on the sorption process which is required and these processes include acid leeching, sorbent extraction, ion exchange and adsorption using activated carbon, activated alumina or other adsorbents. To facilitate the discussion of this invention, it will be described with respect to its use in connection with activated carbon, both granular and powdered, used as the sorbent material and is not intended to limit the scope of this invention.

Figure 4:
FIG. 4 schematically shows the operation steps of the biosorber for wastewater treatment, according to the invention.

An example of the use of the invention is given which is descriptive and does not limit the application of the invention, as is illustrated in FIG. 4:

Step A1. Sewage through the wastewater supply pipeline to the treatment 5 is supplied to a receiving and dispensing chamber 9 in which leveling, accumulation and sedimentation of the drain is ensured before being fed to the biochemical reactor 1.

Step A2. In the receiving and dispensing chamber 9, above the inlet pipe there is a wastewater level sensor 19 and an emergency overflow hole.

Step A3. In the lower part of the receiving-metering chamber, a dispensing pump 10 is provided, which performs a portion feed to the biochemical reactor 1 in an automatic mode.

Step A4. In the biochemical reactor 1, a technological process of biosorption treatment of water through a fluidized bed of activated coal (sorbent) is carried out.

Step A5. The processes of adsorption and regeneration of activated coal (sorbent) are provided by the system of hydroaeration. To do this, a compressor is used to saturate the water with air or oxygen 4, which supplies air through the pump 3 of the system for saturating the water with oxygen in the air to the bioreactor 1.

Step A6. The remote coal removal chamber 11 is equipped with a circulation pump 8 with a flow throttling valve, an air compressor 4 with a non-return valve to prevent water ingress and a servo-injector with a decompression tap of the hydro-aerator path to eliminate the air bubbling of the pump circulation chamber. The operation of the circulation pump 8 and the compressor 4 is carried out automatically.

Step A7. The output of purified water is carried out by displacing it from the reactor at the same time as the next portion of the contaminated run is fed.

Step A8. The automatic control module provides the technological process of flow cleaning, functional monitoring of the operation of pumps and compressor 4, indication and signaling about the current state of the installation.

Step A9. The control mode of the dosing pump and the compressor 4 is cyclic with the following settings: (i) dosing pump: cycle period is 30 minutes, with duration of the on-state being 6 minutes; (ii) compressor: the cycle period is 10 minutes, with the duration of the on-state being 1 min. The circulation pump operates in a constant mode.

Step A10. The automated control module is equipped with current sensors, which determine (according to the current absorbed) the actual operation of the dosing and circulating pumps. If, according to the instantaneous state, the dosing pump is to be switched on and the current consumption is not detected, the dosing pump alarm is indicated and the corresponding warning light comes on. The method for determining the operability of the circulation pump is similar, with the difference that the monitoring of the state of its current sensor is carried out in a constant mode. The alarm of the circulation pump is indicated by another warning light. If, for any reason, the pump has resumed its normal operation (the cabinet power has not been turned off), the alarm goes into intermittent indication mode. In this case, it can be acknowledged by pressing the "Alarm Reset" button.

The stages are exemplary and allow for permutation, addition and partial use.

The circulation pump creates a fluidized bed of active coal, circulates the effluent through active coal and a microfiltration unit (worked continuously). The peristaltic dosing pump doses the coagulant in proportion to the volume of the incoming runoff. Experimental operation of the present invention has shown that such a design provides: organization of laminar upward movement of liquid along the walls of the bioreactor; increase in the working height of the bioreactor due to the absence of a diffuser in the upper part of the column-tube of the reactor (as in the case of analogues—the bell); retention of active coal; reduction of overall dimensions of treatment facilities, increase in the life of the bioreactor, and increase in the degree of wastewater treatment.

Thus, by carrying out a biosorber comprising itself a receiving-dispensing chamber connected via a metering pump to the chamber with a discharged coal separator that is connected to a bioreactor with a fluidized bed of feed through a circulating pump, the biosorber including an automated biosorber control system, and a bioreactor Is equipped with a convex reflector of active coal installed in the upper part of the bioreactor, designed to provide laminar upward movement of liquid along the walls of the bioreactor and a technical result is achieved, namely: increasing the degree of wastewater treatment while ensuring high operational reliability.

Additional achieved technical result: improvement of the ratio between the surface area and the occupied volume of biological loading, Increased corrosion resistance, increase in the strength of the structure of the framework of biological loading, and an improved adaptability to assembly and maintenance of biological loading.

What is claimed is:

1. A biosorber for a wastewater treatment comprising:
   (a) a receiving-metering chamber to receive said wastewater through a supply pipeline for leveling, accumulation and sedimentation, wherein said supply pipeline is located on the upper side of said receiving-metering chamber;
   (b) a fluidized bed of an activated sorbent to carry out processes of biosorption treatment of said wastewater;
   (c) a system for saturating said wastewater with air or oxygen, said system comprising of an air compressor to receive air from an ambient source and injecting said air into said fluidized bed;
   (d) a metering-dosing pump to inject a predetermined dose of said wastewater from said receiving-metering chamber to a second-chamber with a coal discharge trap that is connected to said fluidized bed bioreactor by a circulation pump;
   (e) a convex activated carbon reflector containing an activated carbon mounted at the top of said fluidized bed to provide a laminar upward flow of a liquid along the walls of said fluidized bed, and to capture and recirculate sorbent leaving the fluidized bed;
   (f) an automated biosorber control module to control said metering-dosing pump to displace a purified water with a wastewater, and
   (g) a purified water discharge pipeline.

2. The biosorber according to claim 1, wherein said receiving-metering chamber comprises a coagulant tank for a coagulant connected to a coagulant dispenser.

3. The biosorber according to claim 2, wherein said coagulant dispenser is in the form of a dosing peristaltic coagulant pump.

4. The biosorber according to claim 1, wherein said convex activated carbon reflector is made in the form of a cone.

5. The biosorber according to claim 1, wherein said automated biosorber control module is connected to a coagulant sensor mounted on the coagulant tank.

6. The biosorber according to claim 1, wherein said automated biosorber control module is connected to said metering-dosing pump.

7. The biosorber according to claim 1, wherein said automated biosorber control module is connected to an air compressor of the wastewater saturation system with air or oxygen.

8. The biosorber according to claim 1, wherein said automated biosorber control module is connected to a coagulant dispenser.

9. The biosorber according to claim 7, wherein said air compressor has a check valve to prevent water from entering.

10. The biosorber according to claim 1, wherein said automated biosorber control module is connected to a wastewater level sensor located in the receiving-metering chamber.

11. The biosorber according to claim 1, wherein said automated biosorber control module is connected to a pump operation alarm unit and a wastewater level sensor to alarm if a predefined emergency level of the treated water in the receiving-metering chamber is reached.

12. The biosorber according to claim 1, wherein said automated biosorber control module is connected to a short messaging system (SMS), which signals the loss and recovery of power supply, the occurrence of a dosing and circulating pump failure.

13. A biosorber for a wastewater treatment comprising:
   (a) a fluidized bed bioreactor;
   (b) a receiving-metering chamber;
   (c) an inlet pipeline to bring in said wastewater into said receiving-metering chamber;
   (d) a system for saturating said wastewater with air or oxygen;
   (e) a purified water discharge pipeline;
   (f) a recirculated flow line with a circulation pump;
   (g) said biosorber connected through a metering pump to a chamber with a coal discharge trap that is connected to said fluidized bed bioreactor through said circulation pump, and
   (h) the biosorber further comprising an automated biosorber control module, wherein the bioreactor is provided with a convex activated carbon reflector containing an activated carbon mounted at the top of the bioreactor designed to provide a laminar upward flow of a liquid along the walls of the bioreactor.

* * * * *